US007310368B2

(12) United States Patent
You et al.

(10) Patent No.: US 7,310,368 B2
(45) Date of Patent: Dec. 18, 2007

(54) MEANS FOR INITIATIVE SYNCHRONIZATION AND CELL SEARCHING BASED ON THE CDMA SYSTEM OF MULTIPATH ENERGY WINDOW

(75) Inventors: Xiaohu You, Jiangsu (CN); Jinghong Guo, Jiangsu (CN); Liangcheng Jiang, Jiangsu (CN); Chunming Zhao, Jiangsu (CN); Shixin Cheng, Jiangsu (CN)

(73) Assignees: The Research Institute of Telecommunication Transmission, MII, Beijing (CN); Southeast University, Jiangsu (CN)

( * ) Notice: Subject to any disclaimer, the term of this patent is extended or adjusted under 35 U.S.C. 154(b) by 673 days.

(21) Appl. No.: 10/450,887

(22) PCT Filed: Dec. 18, 2001

(86) PCT No.: PCT/CN01/01634

§ 371 (c)(1),
(2), (4) Date: Dec. 2, 2003

(87) PCT Pub. No.: WO02/080425

PCT Pub. Date: Oct. 10, 2002

(65) Prior Publication Data

US 2004/0076225 A1    Apr. 22, 2004

(30) Foreign Application Priority Data

Dec. 18, 2000    (CN)    ................................ 00 1 28224

(51) Int. Cl.
*H04B 1/00*    (2006.01)
*H03D 1/00*    (2006.01)

(52) U.S. Cl. ........................ 375/148; 375/150; 375/343
(58) Field of Classification Search ................ 375/148, 375/150, 140, 141, 147, 144, 346, 347, 142, 375/130, 145; 370/342, 335, 441, 479
See application file for complete search history.

(56) References Cited

U.S. PATENT DOCUMENTS

| | | | | |
|---|---|---|---|---|
| 5,216,691 A | * | 6/1993 | Kaufmann | ................... 375/150 |
| 5,414,699 A | | 5/1995 | Lee | ............................. 370/18 |
| 5,724,384 A | * | 3/1998 | Kim et al. | ................... 375/149 |
| 5,764,630 A | * | 6/1998 | Natali et al. | ................. 370/320 |
| 5,818,866 A | * | 10/1998 | Wilk | ........................... 375/149 |
| 5,910,948 A | | 6/1999 | Shou et al. | .................. 370/335 |
| 6,067,315 A | * | 5/2000 | Sandin | ........................ 370/252 |
| 6,192,066 B1 | * | 2/2001 | Asanuma | ..................... 375/130 |
| 6,275,695 B1 | * | 8/2001 | Obhan | ......................... 455/423 |
| 6,381,264 B1 | * | 4/2002 | Lomp et al. | ................. 375/149 |

(Continued)

FOREIGN PATENT DOCUMENTS

CN    1132010    9/1996

(Continued)

*Primary Examiner*—Mohammed Ghayour
*Assistant Examiner*—Sophia Vlahos
(74) *Attorney, Agent, or Firm*—Westman, Champlin & Kelly, P.A.

(57) ABSTRACT

The present invention discloses an apparatus for initial synchronization and cell search in a CDMA system based on multipath energy window. The apparatus perform initial synchronization and adjacent cell search by using multipath energy window based on the processing method of multipath energy window. The apparatus can be implemented based on a parallel correlator bank. This invention also provides the application of the apparatus to a coherent spreading receiver.

8 Claims, 1 Drawing Sheet

U.S. PATENT DOCUMENTS

| | | | |
|---|---|---|---|
| 6,430,166 B1 * | 8/2002 | Bejjani et al. | 370/320 |
| 6,560,271 B1 * | 5/2003 | Han | 375/137 |
| 6,643,275 B1 * | 11/2003 | Gustafsson et al. | 370/328 |
| 6,680,967 B1 * | 1/2004 | Westman | 375/148 |
| 6,731,911 B1 * | 5/2004 | Hirata et al. | 455/71 |
| 6,763,056 B1 * | 7/2004 | Ohsuge | 375/140 |
| 6,822,999 B1 * | 11/2004 | Lee et al. | 375/145 |
| 6,901,105 B1 * | 5/2005 | Razzell | 375/148 |
| 6,907,091 B2 * | 6/2005 | Lee | 375/343 |
| 6,950,456 B2 * | 9/2005 | Lee et al. | 375/146 |
| 7,085,246 B1 * | 8/2006 | LaRosa et al. | 370/311 |
| 2004/0179585 A1 * | 9/2004 | Yang et al. | 375/148 |
| 2004/0247019 A1 * | 12/2004 | McDonough et al. | 375/148 |

FOREIGN PATENT DOCUMENTS

| | | |
|---|---|---|
| CN | 1182310 | 5/1998 |
| WO | WO 96/36150 | 11/1996 |

* cited by examiner

MEANS FOR INITIATIVE SYNCHRONIZATION AND CELL SEARCHING BASED ON THE CDMA SYSTEM OF MULTIPATH ENERGY WINDOW

CROSS-REFERENCE TO RELATED APPLICATION

This Application is a Section 371 National Stage Application of International Application No. PCT/CN01/01634, filed 18 Dec. 2001 and published as WO 02/80425 on 10 Oct. 2002, not in English.

FIELD OF THE INVENTION

The present invention relates to a CDMA (code division multiple access) mobile cellular communication system.

BACKGROUND OF THE INVENTION

In a lot of mobile communication standards, recently, CDMA cellular communication technique shows great potential for its features associated with large capacity, simple frequency planning, good communication quality and small electromagnetic interference. CDMA mobile communication has become the key technique of next generation of mobile communication systems.

Most of CDMA cellular mobile communication systems employ direct sequence spread spectrum (DSSS) technique. A transmitter converts the narrow band user information into wideband spread spectrum signals by multiplying narrow band information by a spreading code (PN code). This process is referred to as spread spectrum. A receiver restores the narrow band user information by multiplying received wideband spreading signals by the locally generated synchronous spreading code and integrating operation. This process is referred to as despreading operation. Accordingly, how to synchronizing local spreading code with the received signals is of importance to accomplish despreading operation in a receiver.

There is multipath fading in a mobile communication system, which causes serious multipath interference. In a CDMA cellular mobile communication system, the bandwidth of transmitting signals is typically much larger than that of user information because of the use of spread spectrum technique. Therefore, the CDMA cellular mobile communication system has the capability of distinguishing multipath. Therefore, it is possible to more finely distinguish multipath. However, since the multipath signals, which can be distinguished, have large radomicity, CDMA receivers should have the ability to overcome the multipath fading.

To synchronize with local spreading code in a CDMA receiver, the received signals need to be initially synchronized and finely synchronized. The initial synchronization process is also referred to as PN code acquisition process. The fine synchronization process is also referred to as PN code track process. The PN code initial synchronization process make the phase difference between the local PN sequence generated by the receiver and PN spreading sequence of the received signals smaller than a proper threshold δ. After the process of PN code initial synchronization, due to local oscillation frequency-offset, channel multipath fading, and Doppler frequency-offset etc., the timing will slide. Therefore, the received signals shall be tracked in real time so that the local PN sequence can finely synchronize with received signals all the time.

In CDMA cellular mobile communication systems, in addition to initially synchronize and track the cell which, a mobile terminal is located, it is necessary to search adjacent cells to judge whether or not the mobile terminal performs hand-off or macro-diversity receipt of the arrival signals of a plurality of base stations. The method of searching adjacent cells is similar with that of initial synchronization to a cell except for that the process of searching adjacent cells is only performed in partial area determined in advance without searching all phases of PN code.

CDMA systems have time restricts for initial synchronization of a cell and searching adjacent cells. The time for initial synchronization and searching adjacent cells shall be as short as possible. There are a lot of methods of initial synchronization and searching adjacent cells in DS/CDMA systems. These method may be classified into parallel initial synchronization, series initial synchronization and, parallel and series hybrid initial synchronization in terms of structure domain. In terms of physical domain, the method of initial synchronization may be classified into time domain initial synchronization, frequency domain initial synchronization. In terms of despreading methods, the method of initial synchronization may be classified into initial synchronization based on correlators and initial synchronization based on matching filter. The initial synchronization based on correlators includes fixed correlation length detection and variable correlation length sequential detection.

Conventional initial synchronization and search is used for a certain single-path signal. In multipath transmission circumstances, however, the real received signals typically comprise a plurality of multipath components which have different time-delay. The results of initial synchronization and search for a certain single-path signal are generally not reliable. The present invention is on the basis of the following fact: the energy window of multipath signal and the barycenter position of the window is relatively stable although the amplitude and phase of the signals for each arrival path randomly change in multipath circumstances. If the initial synchronization phase of the local PN code or the PN code phase of adjacent cells is determined based on maximizing multipath signal energy window, and the PN code is finely tracked based on barycenter change of the multipath energy window, the obtained spreading receiver can overcome the non-determinacy due to the processing of single path signals, thereby improving the stability of coherent spreading receivers.

SUMMARY OF THE INVENTION

It is therefore an object of the present invention to provide an apparatus for initial synchronization and adjacent cell search of a CDMA spreading receiver which is introduced a designing method of maximizing multipath energy window with respect to the non-determinacy of the multi fading signals in mobile communication circumstances, thereby improving the performance of the CDMA spreading receiver and reducing hardware thereof.

The present invention provides an apparatus for initial synchronization and cell search in CDMA systems based on multipath energy window. The apparatus of the invention performs initial synchronization and adjacent cell search by using multipath energy windows in accordance with multipath energy window processing method. The invention also provides a parallel implementing method based on correlator bank and describes the application of the method to a coherent spreading receiver.

To achieve the object of the invention, there is provided an apparatus for initial synchronization and cell search in CDMA systems based on a multipath energy window, the apparatus comprises a plurality of tap delay lines, which the number S of the tap delay lines is determined by the minimal time required for initial synchronization and cell search, for sampling the baseband signals r(t) with the rate $T_c/M$, sending the S tap outputs from the plurality of tap delay lines to S parallel correlators; S parallel correlators each of which performs channel evaluation of a single path in one integrating period $NT_c$, clears respective multiplying accumulation units after sending the evaluated result to respective amplitude judging units; a plurality of amplitude judging units for judging whether the square value of the channel evaluation amplitude obtained from respective correlators is larger than a threshold, sending the evaluated amplitude which the pure interference paths are removed to a buffer unit, and then providing the evaluated amplitudes to a sliding multipath energy window calculation unit one by one through a parallel-series conversion unit; a sliding multipath energy window calculation unit for calculating S outputs from sliding multipath energy windows for the S channel evaluations obtained in every integration interval; a maximal energy window calculation unit for comparing every value output from the sliding multipath energy windows and selecting the amplitude having maximal value and the phase of the local pilot PN code associated with the amplitude.

Next, the principle of the invention will be discussed.

1. Evaluating Multipath Fading Channel Parameters

A pilot channel in a CDMA system is used for transferring a pilot sequence known in advance which may provide a system timing, extract carriers, evaluate channels, and execute hand-off, etc. The equivalent baseband receiving signals may be expressed as shown in equation (1) when the system simultaneously transmits signals through a plurality of channels, $$r(t) = \sum_n c_n \cdot \sum_i s_i(t - n/W) + z(t) \qquad (1)$$

wherein $s_i(t)$ represents the signs and equivalent baseband signals transmitted through ith code division channel in downstream channels. The term of i=0 corresponds to the pilot channel. z(t) is complex White Gaussian noise of zero average value, $c_n$ is a fading factor of nth path of the channels. The purpose for evaluating channel parameter is to evaluate channel fading factor $c_n$ based on the received signals r(t) and the known pilot sequence $s_0(t)$.

It is assumed that frequency selectivity slow fading channel model is used as a mobile channel, $c_n$ is then approximate to a constant within the channel evaluation region. The evaluation value of $c_n$ is given as follow:

$$\bar{c}_n = \frac{1}{NE_c} \int_0^{NT_c} r(t - nT_c) \cdot s_0^*(t) dt = c_n + N_a + N_c + N_z \qquad (2)$$

wherein $N_a$, $N_c$, and $N_z$ are the outputs caused by multipath interference, multiple access interference and white noise passed through a correlator due to the non-ideal correlation characteristic, $T_c$ is a time width of one chip, $NT_c$ is an integration region of a channel evaluation, and $E_c$ is energy transmitted through a pilot channel within one chip.

In initial synchronization stage of a CDMA receiver, the phase information of received signals can not be known. It is necessary to evaluate multipath fading channels in fraction intervals, and try evaluation using local pilot sequence (PN code) with different phase. In this case, following equation (4) can be derived from equation (2).

$$\bar{c}_{n,m}(k) = \frac{1}{NE_c} \int_0^{NT_c} r(t - nT_c - mT_c/M) \cdot s_0^*(t - kT_c/M) dt, \qquad (3)$$

$$m = 0, 1, \Lambda M - 1$$

wherein $T_c/M$ is a fraction sampling interval, k is a certain possible phase parameter of tile local pilot PN sequence.

2. Multipath Energy Window and Initial Synchronization Method of PN Code

The effective distribution range of channel fading factor $c_n$ in equation (1) is defined as energy distribution window of multipath signal (hereinafter is referred to as multipath energy window). The size of the window may be determined by time-delay extend range of multipath channels. For the sake of simplifying discussion, the effective distribution range of $c_n$ may be set to $n \in [-L_1, L_2]$. The size of the window in multipath fading circumstances may be set differently for different areas, for example, 3 μs for cities, 6 μs for countries, and 15 μs for mountain areas. The size of window is associated with the circumstances where the cellular communication system is located, and is regardless of the used frequency band. The size of multipath energy window may be selected according to the maximal likelihood value, for example, no more than 30 μs, and then the value of $L=L_2-L_1+1$ is not more than 30 μs/$T_c$ so that a spread spectrum receiver can be used in various circumstances.

In a multipath energy window, not all signal arrival paths are effective. To this end, a threshold may be set to judge the signal energy (i.e., intensity of $c_n$) for each of paths in the window. A signal arrival path is judged as effective path when the signal energy is larger than the threshold. Otherwise, the path is judged as a pure interference path. To avoid the degradation of the performance, the calculation is not applied to all pure interference paths. The threshold is set slightly larger than the side lobe value of a pilot signal (PN code) partial correlation value.

To obtain sufficient acquisition precision, a receiver samples the received signals using over-sampling technique. The sampling rate is M times the chip rate of PN code. Assuming the length of PN code required for synchronizing is p, the PN code initial synchronization method of the invention selects a phase from M×P possible PN code phases, and maximize the multipath energy contained in the multipath energy window.

$$E_{win}(k) = \sum_{n=-L_1}^{L_2} \sum_{m=0}^{M-1} |\bar{c}_{n,m}(k)|^2 \qquad (4)$$

the initial synchronization method based on multipath energy window is then described as selection of a value k which makes following equation (5) have a maximal value from all possible values k of local PN code phase:

$$\max_k E_{win}(k) \qquad (5)$$

Thus, the phase of local pilot PN code, which corresponds to the energy window having maximal value, is the best PN code phase $k_{opt}$.

On the other hand, it can be seen from equation (3), the multipath energy window calculation as shown in equation (4) exists following derivative relationship associated with a sliding window:

$$E_{win}(k+1) = E_{win}(k) - |\bar{c}_{L_2,M-1}(k)|^2 + |\bar{c}_{L_1,0}(k+1)|^2 \qquad (6)$$

Thus, initial synchronization calculation can be greatly simplified.

3. Adjacent Cell Search Method Based on Sliding Multipath Energy Window

The method of searching adjacent cells is similar with that of PN code initial synchronization except for that the PN code used in the equations is a pilot signal sequence of a certain adjacent cell, and the areas which are searched are determined by a base station in advance without searching all phases of PN code.

4. The Processes of confirming PN Code Initial Synchronization and Cell Search

In above initial synchronization process, whether or not the result of the initial synchronization is valid is judged by comparing to a threshold one time. In practice, it can be judged by comparing to a threshold a plurality of times. At that time, it only need to calculate the energy window at $k=k_{opt}$ with a plurality of times. The initial synchronization is successful if each of the results is larger than the threshold. In this case, only the time taken for initial synchronization is slightly longer. Another practical process of confirming initial synchronization checks whether or not the receiving states of other data channels are normal after finishing the initial synchronization so as to judge whether the initial synchronization is successful or not.

The process of judging whether or not the result of adjacent cell search is valid is similar with the process of PN code initial synchronization.

The advantages of the present invention are as follows:

1. The initial synchronization method based on multipath energy window according to the invention can maximize the multipath time-delay distribution energy, can overcome the non-determinacy of the system due to the processing of single path signals in conventional initial synchronization method. Therefore, the apparatus according to the invention is applicable to a mobile cellular communication system in the circumstances of multipath fading channel.

2. The apparatus of the invention employs a sliding multipath energy window calculation method and is facilitated to implement.

3. The apparatus of the invention integrates the initial synchronization and adjacent cell search of a CDMA receiver in the manner of time division multiplexing (TDM), the complexity of the hardware used in a system is therefore greatly reduced.

4. It takes a shorter time for initial synchronization and adjacent cell search since the calculation is operated in parallel.

BRIEF DESCRIPTION OF THE DRAWINGS

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
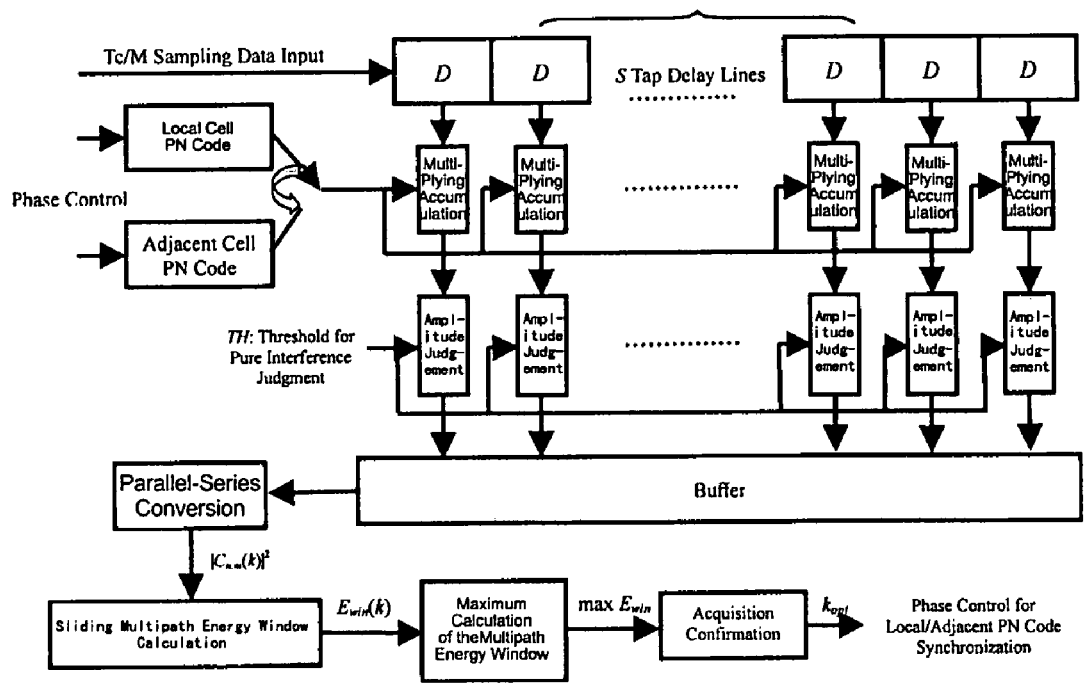
FIG. 1 schematically illustrates a block diagram of implementing initial synchronization and adjacent cell search based on the multipath energy window of the apparatus according to an embodiment of the invention.

Referring now to the accompanying drawings, there is shown preferred embodiment of the invention. FIG. 1 shows a block diagram of the apparatus for initial synchronization and adjacent cell search based on the multipath energy window of the apparatus according to an embodiment of the invention. The apparatus comprises S tap delay lines, S parallel correlators, a local cell PN code generation unit, an adjacent cell PN code generation unit, amplitude judgment units, a buffer unit, a parallel-series converter unit, a sliding multipath energy window calculation unit, a maximal energy window calculation unit, and a initial synchronization confirmation unit. The functions of each of the units will be described as follows.

The baseband signals r(t) sampled in $T_c/M$ rate is sent to the S tap delay lines. The number S of the tap delay lines is determined by the time taken for initial synchronization and cell search. S tap outputs are provided to the S parallel correlators respectively.

Each of the S parallel correlators (multiplying accumulation units) performs channel evaluation integration operation as shown in equation 3. If it is used for initial synchronization process, the integration operation is performed with the PN code output from the PN code generation Unit for current cell. If it is used for cell search process, the integration operation is performed with the PN code output from the PN code generation unit for adjacent cell. Each of the correlators performs the channel evaluation for one path in one integration period $NT_c$. The integrated results are supplied to the corresponding followed amplitude judgement units, and then the multiplying accumulation units are cleared.

The amplitude judgement units judge the amplitude square values of the channel evaluation obtained from the correlators, send the evaluated results of which pure interference channels are removed to the buffer unit. Then, the evaluated results output from the buffer unit is sent to the sliding multipath energy window calculation unit through the parallel-series converter unit.

The sliding multipath energy window calculation unit performs the calculation as shown in equation 6. S output values of the sliding multipath energy windows could be obtained for the S channel evaluation in each of integration periods.

The maximal energy window calculation unit compares the calculated energy output from the sliding multipath energy window calculation units, selects the energy having maximal value and the phase of the local pilot PN code which corresponds to the energy. This result is sent to the initial synchronization confirmation unit (acquisition confirmation).

The initial synchronization confirmation unit may judges initial synchronization using threshold judgement method for one time (the threshold is determined as desired, in general, the threshold is larger 1/10 than the total energy of the input signals). If the maximal energy is larger than the threshold, the initial synchronization process or cell search process is valid. Thus, the phase of local pilot PN code, which corresponds to the energy window having maximal value, is the best PN code phase $k_{opt}$. Otherwise, this initial synchronization process or cell search process is fail. Naturally, the threshold judgement method can be performed more times for confirming the initial synchronization.

Next, the phase of the local PN code generation unit in a receiver is shifted to the best PN code phase $k_{opt}$. After that, the process of initial synchronization or cell search is completed.

Since evaluations of S multipath energy windows can be obtained in each of integration periods, the local cell PN code generation unit or the adjacent cell PN code generation unit as shown in FIG. 1 jumps S phases backward or forward after completing integration once.

Next, the time taken for initial synchronization is calculation. Since the local PN sequence has M×P possible PN code phase, the present embodiment uses S parallels calculation units, therefore, S phases can be searched within $T_d=NT_c$ integration, period. Thus, the time taken for initial synchronization is:

$$T_{acq} = \frac{M \times P}{S} NT_c \quad (7)$$

The principle of adjacent cell search is similar with that of initial synchronization, therefore, the process of adjacent cell search can be implement in a maser of time division multiplexing. After initial synchronization, the phase difference between the pilot sequence of the adjacent cells and the pilot sequence of the local cell and, the search range can be obtained by receiving the information broadcast from the local base station. The adjacent cell search can be performed by replacing the local pilot sequence and whole search range used in initial synchronization process with the local pilot sequence and search range of adjacent cells. FIG. 1 shows this time division multiplexing manner.

Similarly, the time taken for adjacent cell search is calculated as follows:

$$T_{srch} = \frac{M \times P_{srch}}{S} NT_c \quad (8)$$

wherein $P_{srch}$ is the area to be searched ($T_c$ as time unit). After searching, the obtained maximal multipath energy window is reported to the base station to determined whether or not hand-off or macro-diversity shall be performed.

The implement of the present invention is described with a mobile terminal in CDMA 2000-1x system as an example. The downstream channel in CDMA 2000-1x system includes continuously transmitting pilot channels used for extracting timing, initial synchronization, cell search and coherent demodulation etc. In this system, the spreading chip rate is 1.2288 Mcps, chip interval is $T_c=1/1.2288$ ms, the pilot channel PN code is a pseudo random sequence with length $N=2^{15}$.

If the receiver employs 4 times the chip sampling rate, that is, M=4, each integration period is 256 $T_c$ and the maximal initial synchronization time required for the system is $T_{acq\_max}$, the number of the parallel correlators is then:

$$S > \left\lceil \frac{4 \times 2^{15} \times 256 T_c}{T_{acq\_max}} \right\rceil + 1$$

In fact, it may take $T_{acq\_max}<0.5$ s, then, the number of the parallel correlators is S=64

Since CDMA 2000-1x system has a low spreading chip rate, the complexity associated with hardware can be reduced with a manner of time division multiplexing. In this example, each of physical correlators multiplexes 32 times. Therefore, it needs 4 correlators in plural form. The threshold used for judging interference paths is set to 1/32 the energy of received signals. The threshold used for initial synchronization of maximal multipath energy window is set to 1/16 the energy of received signals.

This example can apply to a vehicle mobile station in CDMA2000-1x cellular mobile communication system fitting Standard 3GPP2 Release A. The spread spectrum receiving part in the mobile station can be implemented by, for example, a XC4085x1a FPGA chip, a product of Xilinx company. The spread spectrum receiver to which the apparatus according to the invention is applied can provide excellent stability in the circumstances of vehicle mobile terminals.

Industry Practicability

The initial synchronization method based on multipath energy window according to the invention can maximize the multipath time-delay distribution energy, can overcome the non-determinacy of the system due to the processing of single path signals in conventional initial synchronization method. Therefore, the apparatus according to the invention is applicable to mobile cellular communication system in the circumstances of multipath fading channel. The apparatus of the invention employs a sliding multipath energy window calculation method and is facilitated to implement. The apparatus of the invention integrates the initial synchronization and adjacent cell search of a CDMA receiver in the manner of time division multiplexing (TDM), the complexity of the hardware used in a system is therefore greatly reduced. It takes a shorter time for initial synchronization and adjacent cell search since the calculation is operated in parallel.

What is claimed is:

1. An apparatus for initial synchronization and cell search in CDMA systems based on a multipath energy window comprises:
   a plurality of tap delay lines, in which the number S of the tap delay lines is determined by the minimal time required for initial synchronization and cell search, for sampling baseband signals r(t) with a rate $T_c/M$, sending the S tap outputs from the S tap delay lines to S parallel correlators, where $T_c/M$ is a fraction sampling interval, $T_c$ is the chip rate of the CDMA system and M is the oversampling rate;
   each of the S parallel correlators performs channel evaluation of a single path in one integrating period $NT_C$, clears the respective multiplying accumulation units of each correlator after sending the evaluated results to respective amplitude judging units;

a plurality of amplitude judging units for judging whether the square value of the channel evaluation amplitude obtained from respective correlators is larger than a threshold which is used for judging a signal arrival path as a pure interference path when the evaluation amplitude is lower than the threshold, sending the evaluated amplitude with which the pure interference paths are replaced with a zero value to a buffer, and then providing the evaluated amplitudes to a sliding multipath energy window calculation unit one by one through a parallel-series conversion unit;

a sliding multipath energy window calculation unit for calculating S outputs from sliding multipath energy windows for the S channel evaluations obtained in every integration interval; and a maximal energy window calculation unit for comparing every value output from the sliding multipath energy windows and selecting the amplitude having maximal value and the phase of the local pilot PN code which corresponds to the amplitude.

2. The apparatus for initial synchronization and cell search in CDMA systems based on a multipath energy window according to claim 1, wherein each of the S parallel correlators performs channel evaluation integration operation as follows:

$$\overline{c}_{n,m}(k) = \frac{1}{NE_c} \int_0^{NT_c} r(t - nT_c - mT_c/M) \cdot s_0^*(t - kT_c/M) dt,$$

$$m = 0, 1, \cdots M - 1$$

where k is a possible phase parameter of the local pilot PN sequence, M is a real number, n denotes the nth arrival path, and $s_0$ denotes a local PN Ser. No.; wherein, for the process of initial synchronization, the integration operation uses the PN code output from a local cell PN code generation unit; and for the process of cell search, the integration operation uses the PN code output from an adjacent cell PN code generation units.

3. The apparatus for initial synchronization and cell search in CDMA systems based on a multipath energy window according to claim 2, wherein the sliding multipath energy window calculation unit calculates S outputs from sliding multipath energy windows with respect to the S channel evaluations in each integration interval as follows:

$$E_{win}(k+1) = E_{win}(k) - |\overline{c}_{L_2,M-1}(k)|^2 + |\overline{c}_{L_1,0}(k+1)|^2.$$

4. The apparatus for initial synchronization and cell search in CDMA systems based on a multipath energy window according to claim 1, further comprises an initial synchronization confirmation unit for judging the maximal value from the outputs from maximal energy window calculation unit and the local pilot PN code phase associated with the maximal value; wherein if the maximal energy is larger than a threshold, the process of initial synchronization or cell search is valid, and the phase of local pilot PN code associated with the energy window having maximal value is the best PN code phase $k_{opt}$, otherwise, the process of initial synchronization or cell search fails.

5. The apparatus for initial synchronization and cell search in CDMA systems based on a multipath energy window according to claim 1, wherein the local PN code generation unit is shifted to the best PN code phase $k_{opt}$ if the process of initial synchronization process or cell search is valid.

6. The apparatus for initial synchronization and cell search in CDMA systems based on a multipath energy window according to claim 1, wherein the initial synchronization confirmation unit judges initial synchronization with a threshold judgement one time.

7. The apparatus for initial synchronization and cell search in CDMA systems based on a multipath energy window according to claim 1, wherein the initial synchronization confirmation unit only needs to calculate the maximal value of the multipath energy window at $k=k_{opt}$, one or more times, and the initial synchronization is successful if the corresponding one or more results are larger than the threshold.

8. The apparatus for initial synchronization and cell search in CDMA systems based on a multipath energy window according to claim 1, wherein the adjacent cell search is implemented in the manner of time division multiplexing.

* * * * *

UNITED STATES PATENT AND TRADEMARK OFFICE
CERTIFICATE OF CORRECTION

PATENT NO. : 7,310,368 B2
APPLICATION NO. : 10/450887
DATED : December 18, 2007
INVENTOR(S) : You et al.

It is certified that error appears in the above-identified patent and that said Letters Patent is hereby corrected as shown below:

Please replace the equation on in Col. 4, line 10 with the following:

$$c_{n,m}(k) = \frac{1}{NE_c} \int_0^{NT_c} r(t - nT_c - mT_c/M) \cdot s_0^*(t - kT_c/M) dt$$

$$m = 0, 1, \Lambda M - 1$$

Signed and Sealed this

Third Day of June, 2008

JON W. DUDAS
*Director of the United States Patent and Trademark Office*